3,817,709
SOLUTE DISSOLVING APPARATUS HAVING SOLUTION CHAMBER WITH SOLUTION CIRCULATION MEANS
Dennis Lee Ramge, Waterville, Ohio, assignor to Johns-Manville Corporation, Greenwood Village, Colo.
Filed Feb. 27, 1973, Ser. No. 336,399
Int. Cl. B01d 11/02
U.S. Cl. 23—267 E                                                              1 Claim

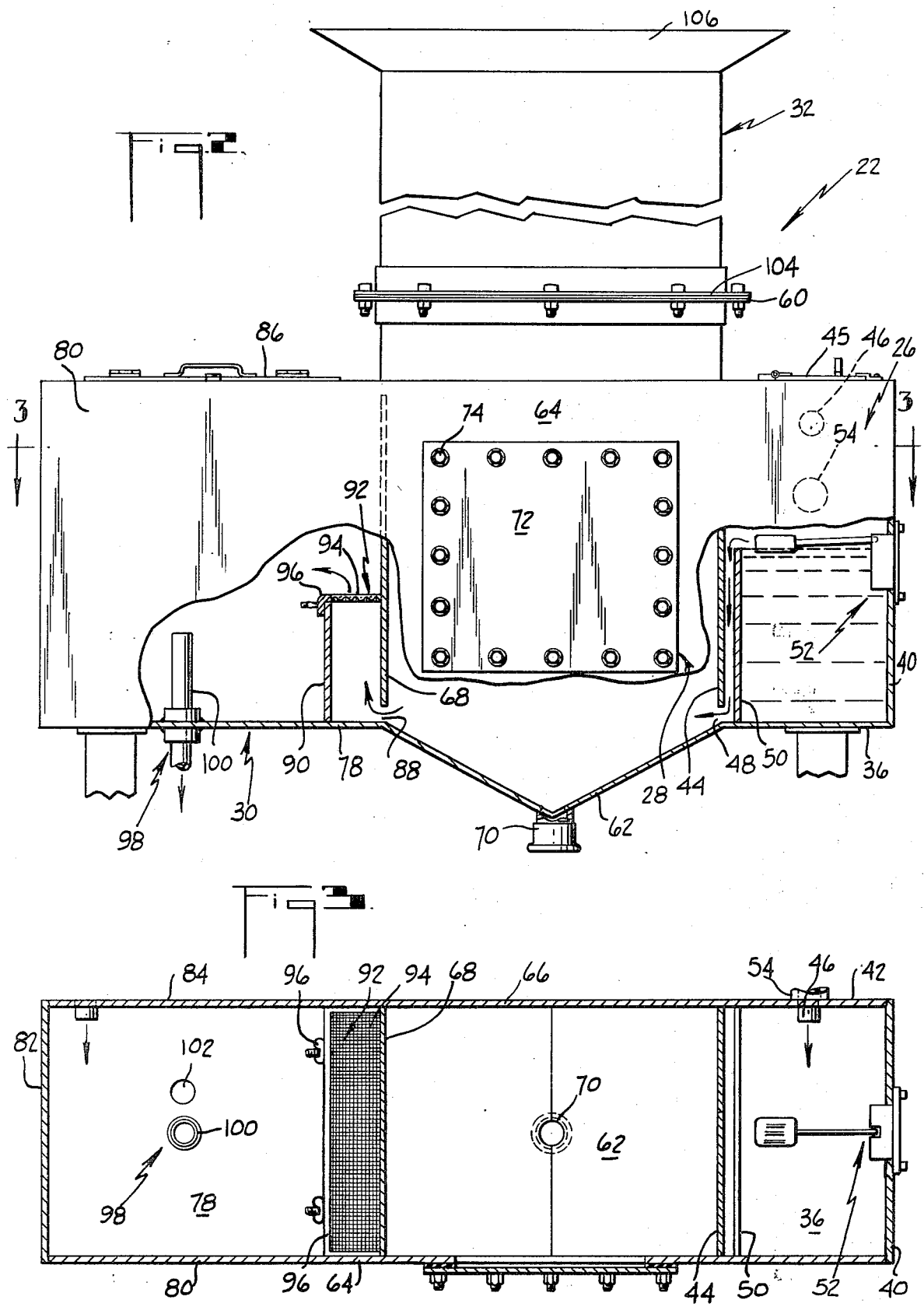

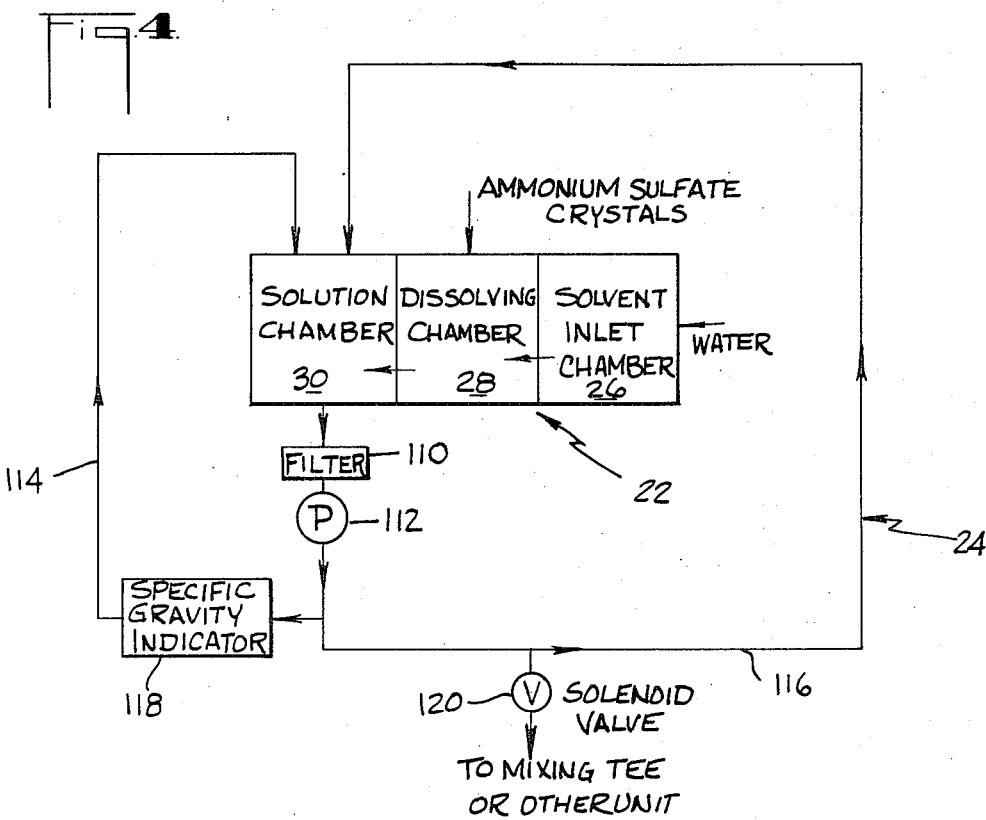

ABSTRACT OF THE DISCLOSURE

An improved solute dissolving system is utilized in a binder mixing system which supplies binder to a glass filament or fiber forming operation. The system includes a tank having a solvent inlet chamber, a solute dissolving chamber and a solution chamber. The solute dissolving chamber is provided with a chute through which the solute is introduced into the dissolving chamber to form a saturated solution. The solvent inlet chamber is coupled by a passageway to the dissolving chamber and the dissolving chamber is coupled to the solution chamber by a passageway provided with a sieve. The solution from the tank is continuously pumped through a closed loop which removes and reintroduces the saturated solution into the solution chamber. The closed loop is provided with an outlet connected to the binder mixing system for tapping off the solution as it is needed in the binder mixing system for the formation of binder.

BACKGROUND OF THE INVENTION

The present invention is directed to a binder forming operation and in particular to an improved solute dissolving system and method used in such a binder forming operation.

A binder for glass filament or glass fiber producing operations typically includes a mix of ammonia, phenolic resin, ammonium sulfate and water. Each of the ingredients has a specific function with the concentrated ammonium sulfate solution being added as a cure catalyst and as a color regulator. In the past, binders have been prepared by mixing the various ingredients in a batch tank or by mixing the ingredients in an additive in-line binder mixing system.

When mixing the binder in a binder batching tank the ammonia, phenolic resin, ammonia sulfate crystals and water are all introduced into a batching tank. With this method, the ammonium sulfate crystals are weighed and added by hand to the batching tank where they are dissolved and mixed with the other ingredients to form the binder.

In an additive in-line system, the ammonium sulfate crystals are mixed with ammonia and water in a batching tank with the ammonium sulfate crystals again being weighed and added by hand to the batching tank. After the ammonia, ammonium sulfate and water are thoroughly mixed, the resultant solution is mixed with the remaining ingredients of the binder.

While the additive in-line binder mixing system is somewhat more streamlined than the other mixing system, both systems involve the batch mixing of ingredients wherein ammonium sulfate, in crystalline form, is weighed and added by hand with a scoop to a binder batching tank. This, of course, can result in solutions having an improper concentration of ammonium sulfate due to operator error, e.g., adding an improper amount of ammonium sulfate. While ammonium sulfate can be purchased as a solution, it is much easier to handle in its crystalline form for the purposes of storage and transportation. Consequently, from a commercial point of view, it is desirable to keep the ammonium sulfate in its crystalline form until it is time to form the ammonium sulfate solution for the binder.

BRIEF SUMMARY OF THE INVENTION

Consequently, it is an object of the present invention to provide a method and apparatus for producing a solution such as an ammonium sulfate solution, wherein manual labor is minimized and the concentration of the solute in the solution can be predetermined and held constant.

It is a further object to provide a method and apparatus which produces a solution that is free of undissolved crystals and other foreign matter so that the solution is pumpable and will not damage the binder mixing and applicating systems.

Accordingly, the apparatus of the present invention includes a tank having a solvent inlet chamber, a solute dissolving chamber and a solution chamber. The solute dissolving chamber is provided with a chute through which the solute is introduced into the dissolving chamber to form a saturated solution. The level of the solute in the dissolving chamber is maintained above the solvent level in the dissolving chamber and the flow of solvent through the dissolving chamber is maintained at a rate to assure that a saturated solution is produced. The passageway connecting the dissolving chamber with the solution chamber is provided with a sieve to prevent crystals and foreign material from passing into the solution chamber. The solution chamber forms part of a closed loop with the solution being continually pumped through the loop and chamber. The closed loop is provided with an outlet for tapping off the solution as needed either in a continuous completely automatic binder mixing system such as an in-line binder mixing system or for supplying solution to a batching tank.

BRIEF DESCRIPTION OF THE DRAWINGS

FIG. 2 is a side view partially in section of the dissolving tank;

FIG. 3 is a cross sectional view taken substantially along lines 3—3 of FIG. 2; and FIG. 4 is a block diagram of the solute dissolving system of the present invention.

DETAILED DESCRIPTION AND PREFERRED EMBODIMENTS

Figure 1:
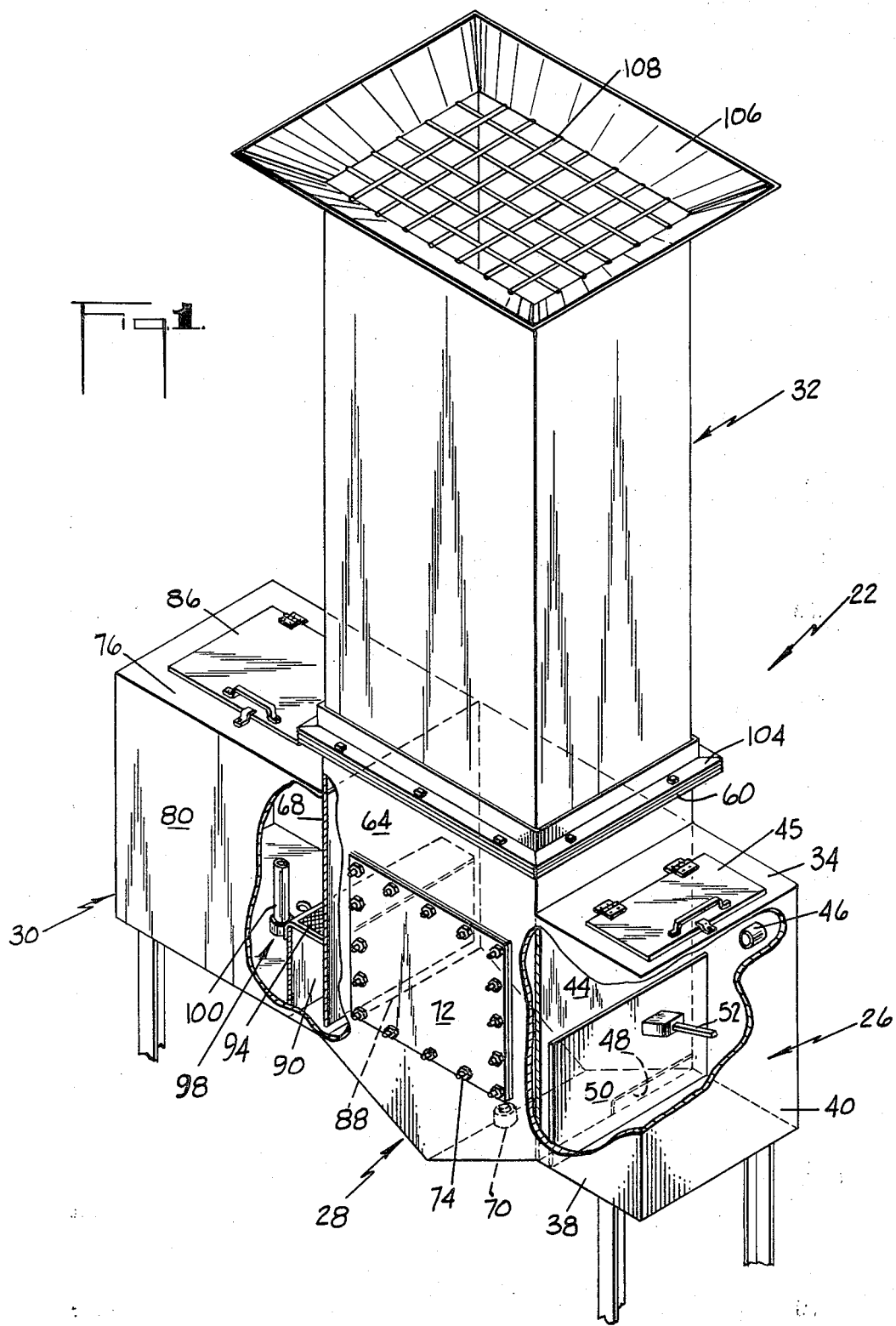
FIG. 1 is an isometric view of the dissolving tank of the present invention.

The solute dissolving system 20 of the present invention includes a solute dissolving tank 22 and a closed loop circulating system 24 for withdrawing solution from the tank and reintroducing the solution into the tank to keep the solution circulating. The system is designed to operate at ambient temperatures e.g., about 70° F. and is designed to produce a saturated solution of the solute being dissolved. By maintaining a saturated solution in the solute dissolving system, the amount of ammonium sulfate mixed with the other ingredients of the binder can be accurately controlled by adding a predetermined quantity of the solution. The circulation of the solution through the closed loop 24 helps to maintain the solution at a constant temperature throughout the system and thereby prevent crystallization of the solute due to a lowered temperature at some point in the system which could form a super saturated solution.

The method and apparatus of the present invention can be used in both an automatic true in-line binder mixing system wherein each ingredient of the binder is separately metered into a mix line in fluid form from its own circulating loop and semiautomatic systems wherein each ingredient is added in fluid form to a batching tank.

The dissolving tank 22 includes a solvent inlet chamber 26, a solute dissolving chamber 28, a solution chamber 30 and a solute charging chute 32. The solvent inlet chamber 26, the solute dissolving chamber 28 and the solution chamber 30 are arranged in series with the solvent inlet chamber communicating with the solute dissolving chamber and the solute dissolving chamber communicating with the solution chamber. The solute charging chute 32 is located above the solute dissolving chamber and communicates directly with the solute dissolving chamber. The materials utilized in the dissolving tank should be selected according to the type of material being dissolved and the solution formed in the tank to prevent corrosive reactions between the dissolving tank and the materials being dissolved and formed within the tank. When forming saturated ammonium sulfate solutions from ammonium sulfate crystals a 316 stainless steel and pvc plastics have proved to be acceptable materials.

The solvent inlet chamber 26 includes an upper wall 34, a lower wall 36 and exterior side walls 38, 40 and 42. In addition, the chamber 26 includes a side wall 44 which forms a common side wall for the solvent inlet chamber 26 and the solute dissolving chamber 28.

The solvent (e.g., water when forming an ammonium sulfate solution) is introduced into the chamber 26 through a supply conduit 46 from a suitable source of solvent (not shown). The solvent flows from the solvent inlet chamber 26 to the solute dissolving chamber 28 through a slot 48 located at or adjacent the bottom of the common side wall 44 between the chambers 26 and 28. The size of the slot 48 depends on the amount of flow required from the solvent inlet chamber to the solute dissolving chamber. The slot is kept as small as possible to prevent the solute (e.g., crystals in the case of ammonium sulfate) from passing from the dissolving chamber into the solvent inlet chamber. The solvent inlet chamber is also provided with a baffle plate 50 which extends upward from the lower wall 36 and substantially parallel to the wall 44 intermediate side walls 38 and 42 of the chamber. The baffle plate 50 is spaced from the side wall 44 and is welded or otherwise affixed to lower wall 36 and the side walls 38 and 42. While the height of the baffle plate 50 can vary, the height of the baffle plate typically is about half the height of the solvent inlet chamber 26. The baffle 50 and the slot 48 at the lower end of the side wall 44 act to prevent the solute in the dissolving chamber from passing into the solvent inlet chamber 26.

The solvent inlet chamber 26 is also provided with a conventional float assembly 52 which monitors the level of the solvent within the chamber to maintain the solvent at a level above an upper edge of the baffle 50 but below an overflow duct 54. The float assembly 52 actuates a valve in the supply conduit 46 to regulate the flow of the solvent into the solvent inlet chamber. The overflow 54 leads to a reservoir and is provided as a safety precaution in case the float assembly malfunctions.

The solvent dissolving chamber 28 includes an open upper end provided with a horizontally extending peripheral flange 60, a bottom wall 62, outer side walls 64 and 66, the side wall 44 and a side wall 68 which forms a common side wall between the solute dissolving chamber and the solution chamber 30. The flange 60 at the upper end of the chamber is provided to connect the chamber 28 with the charging chute 32. The bottom wall 62 is made up of two plates which are inclined downwardly from the side walls 44 and 68 to the center of the chamber where they meet. A drain assembly 70 is provided at the center of the chamber to facilitate the cleaning of the chamber and the removal of foreign matter from the chamber which accumulates there during the dissolving process. The side wall 64 is provided with a removable plate 72 that covers an opening in the side wall. The plate is secured to the side wall by means of nut and bolt assemblies 74 with a seal between the plate and the side wall preventing the seepage of fluid from the chamber.

The solution chamber 30 includes an upper wall 76, a bottom wall 78, side walls 80, 82 and 84 plus the side wall 68. The upper wall 76 is provided with an opening and cover 86 to permit inspection and access to the solution discharge chamber. The cover is mounted on hinges and is normally fastened by conventional fastening means in the closed position. The side wall 68 is provided with an opening 88 between the solute dissolving chamber 28 and the solution chamber 30. The opening 88 is located at or adjacent the bottom of the wall 68 and in the preferred form extends between side walls 80 and 84. The solution discharge chamber 30 is also provided with a baffle plate 90 which extends parallel to the wall 68 intermediate side walls 80 and 84. The baffle plate 90 extends upward from the botom wall 78 and is welded or otherwise affixed to side walls 80 and 84 plus the bottom wall 78. The baffle plate 90 is spaced from the wall 68 so that a horizontally extending opening 92 is defined by the walls 68, 80 and 84 plus an upper edge of the baffle plate 90. A screen 94 is removably clamped in place over the opening 92 by conventional clamping means 96. While other substances may require screens of different sizes a U.S. Standard Sieve Screen No. 30 has proved acceptable when used in the formation of ammonium sulfate solutions. The screen 94 prevents ammonium sulfate crystals as well as foreign matter such as stones, pieces of metal, etc. in the dissolving chamber from entering the solution chamber, while the height of the baffle plate 90 can vary, the height of the baffle plate 90 must be less than the height of the baffle plate 50. This is due to the specific gravity of the solution which will be greater than the specific gravity of the solvent. Consequently, if the solvent is to flow from the solvent inlet chamber 26 to the solute dissolving chamber 28 and if the solution is to flow from the solute dissolving chamber 28 to the solution chamber 30, the head produced by the solvent in the solvent inlet chamber must be greater than the head produced by the solution in the solution chamber. Consequently, the height of the solvent level in the solvent inlet chamber must be greater than the height of the baffle 90 and consequently the opening 92 in the solution chamber.

The solution chamber is provided with an outlet 98 which includes a removable nipple 100. The outlet 98 communicates with the closed loop circulating system 24 which circulates the solution back into the solution chamber through a return conduit 100 in the wall 84. Since the grade of ammonium sulfate utilized generally contains impurities such as tar the nipple 100 is provided so that the outlet for the solution chamber is located above the level of the sludge which will collect in the bottom of the solution chamber. In addition, a conventional drain assembly 102 is provided in the botom wall 78 of the solution discharge chamber to facilitate the removal of the sludge from the chamber.

The charging chute 32 is a tubular member with a rectangular cross section. Peripheral flanges 104, adjacent the bottom of the charging chute, are bolted to the peripheral flanges 60 of the solute dissolving chamber to mount the charging chute on the dissolving tank. The upper end of the charging chute is provided with outwardly and upwardly inclined peripheral flanges 106 to facilitate the introduction of ammonium sulfate crystals or other solutes into the chute and the dissolving chamber. A screen 108 across an upper opening of the charging chute 32 prevents large foreign objects from being introduced into the chamber. The height of the chute 32 can be varied. However, the height of the chamber is generally such that enough solute (e.g., ammonium sulfate crystals) can be stored within the chute and the dissolving chamber to supply the process for a period of one or two days.

In operation, the solute is introduced into the charging chute 32. The solute passes from the charging chute into the solute dissolving chamber 28. Typically, enough solute is introduced into the charging chute to provide a quantity of solute which will last for one or two days. The solvent is introduced into the dissolving tank through the conduit 46 with the float assembly 52 maintaining the proper level of solvent in the solvent inlet chamber 26. From the solvent inlet chamber 26 the solvent flows through the opening 48 into the solute dissolving chamber 28 where a portion of the solute in the chamber is immersed within the solvent. From the solute dissolving chamber 28 the solution formed passes through openings 88 and 92 and into the solution chamber 30. The screen 94 prevents any relatively large foreign objects from being introduced into the solution discharge chamber.

As best shown in FIG. 4, the solution passes from the solution chamber 30 out through a filter 110 and a pump 112 which pumps the solution through loops 114 and 116 of the closed loop circulating ssytem 24. The closed loop 114 has a conventional specific gravity indicator 118 to give an indication of the concentration of the solute in the solution. As long as the solute within the dissolving chamber 28 is maintained at or above the level of the solvent in the dissolving chamber and the rate of flow of the solution from the dissolving chamber is not too rapid, a saturated solution will be produced. However, if the solute falls below the level of solvent or if the flow of solvent through the chamber is too great the concentration of the solution may drop. Consequently, the specific gravity indicator 118 enables an operator to check on the process to insure that it is functioning properly. The second loop 116 of the closed loop system 24 also returns the solution to the solution chamber. However, this loop is provided with an outlet 120 equipped with a solenoid valve that is actuated to remove the solution from the closed loop 116 as it is needed. The solution can be introduced into a mixing tee of a true in-line binder mixing system or into a batching tank of a semi-automatic binder producing system.

What is claimed is:

1. In a binder mixing system wherein each ingredient of the binder is mixed with the other ingredients of the binder in liquid form, the improvement comprising a solute dissolving system for forming one of the ingredients comprising:

(a) a tank, the tank comprising a solvent inlet chamber, means for introducing a solvent into the solvent inlet chamber; a solute dissolving chamber, charging chute means for introducing a solute into the solute dissolving chamber and for holding a reserve of the solute for introduction into the solute dissolving chamber as the solute is required to replace dissolved solute, and means for maintaining the level of solvent within the solute dissolving chamber below a predetermined level whereby the solvent is immersed within the solute in the dissolving chamber; and a solution chamber, a first opening means for connecting the solvent inlet chamber with the solute dissolving chamber, a second opening means for connecting the solute dissolving chamber with the solution chamber, sieve means in the second opening means for preventing undissolved solute and foreign matter from passing through the second opening means into the solution chamber, and (b) closed loop circulating system means for continuously circulating the solution formed in the tank through the solution chamber without passing through the solvent inlet chamber, dissolving chamber or the binder mixing system to prevent recrystallization of the solute, said system including a conduit forming with said solution chamber said closes loop, pump means for circulating said solution through said closed loop, means for measuring specific gravity of the solution within the closed loop, and outlet means for removing the solution from the closed loop circulating system as needed for mixing with other ingredients in the binder mixing system.

References Cited

UNITED STATES PATENTS

| 2,891,845 | 6/1959 | Agnew | 23—312 AH |
| 3,710,811 | 1/1973 | Leverenz | 23—312 AM |
| 3,307,914 | 3/1967 | Heiss | 23—312 AH |
| 2,822,248 | 2/1958 | Harmony | 23—312 AH |
| 3,385,674 | 5/1968 | Kolasinski | 23—312 AH |
| 3,073,674 | 1/1963 | Rudelick | 23—272.6 R |
| 3,537,707 | 6/1962 | Ligon | 23—272.6 R |

FOREIGN PATENTS

| 637,912 | 3/1962 | Canada | 23—312 AH |
| 288,421 | 1/1953 | Switzerland | 23—272.6 |

NORMAN YUDKOFF, Primary Examiner

S. J. EMERY, Assistant Examiner

U.S. Cl. X.R.

23—272.6 R